US009571225B2

United States Patent
Xu et al.

(10) Patent No.: US 9,571,225 B2
(45) Date of Patent: Feb. 14, 2017

(54) METHOD AND APPARATUS FOR OPTIMIZING TARGET ERROR RATES FOR LINK ADAPTATION IN A COMMUNICATION SYSTEM

(75) Inventors: Xiao Xu, Des Plaines, IL (US); Hua Xu, Lake Zurich, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1946 days.

(21) Appl. No.: 12/499,400

(22) Filed: Jul. 8, 2009

(65) Prior Publication Data

US 2011/0007790 A1    Jan. 13, 2011

(51) Int. Cl.
    H04B 3/46     (2015.01)
    H04L 1/00     (2006.01)
    H04L 1/18     (2006.01)

(52) U.S. Cl.
    CPC ........... *H04L 1/0001* (2013.01); *H04L 1/0003* (2013.01); *H04L 1/0009* (2013.01); *H04L 1/0041* (2013.01); *H04L 1/1887* (2013.01); *Y02B 60/31* (2013.01)

(58) Field of Classification Search
    CPC .... H04L 1/0001; H04L 1/0003; H04L 1/0009; H04L 1/0041; H04L 1/1887; Y02B 60/31
    USPC ....... 375/224, 225, 259, 260, 261, 267, 275, 375/346, 359; 370/236, 310, 329, 335, 370/342, 468, 543
    See application file for complete search history.

(56) References Cited

U.S. PATENT DOCUMENTS

| | | | |
|---|---|---|---|
| 6,178,448 B1 | 1/2001 | Gray et al. | |
| 7,292,825 B2 | 11/2007 | Beale et al. | |
| 7,453,805 B2 | 11/2008 | Velev et al. | |
| 7,463,677 B2 | 12/2008 | Chuang et al. | |
| 2002/0141362 A1* | 10/2002 | Hsu et al. | ..................... 370/331 |
| 2003/0123406 A1 | 7/2003 | Yavuz et al. | |

(Continued)

FOREIGN PATENT DOCUMENTS

| | | |
|---|---|---|
| CN | 101309130 A | 11/2008 |
| EP | 1284549 B1 | 12/2004 |

(Continued)

OTHER PUBLICATIONS

Patent Cooperation Treaty, International Search Report and Written Opinion of the International Searching Authority for International Application No. PCT/US2010/035921, Aug. 25, 2010, 20 pages.

(Continued)

*Primary Examiner* — Syed Haider
(74) *Attorney, Agent, or Firm* — Lerner, David, Littenberg, Krumholz & Mentlik, LLP (57) ABSTRACT

A method and apparatus for optimizing target error rates for link adaptation in a communication system. The method includes estimating a data rate associated with transmission of a data stream over a communication link. A required target error rate is then selected from a plurality of pre-defined target error rate values based on whether the estimated data rate is within a range of at least one of a plurality of pre-defined threshold values, where each of the pre-defined target error rate values maps to one of the plurality of pre-defined threshold values. A link adaptation parameter associated with the communication link is then selected or updated to maintain the required target error rate and the data stream is transmitted over the communication link using the selected/updated link adaptation parameter.

20 Claims, 4 Drawing Sheets

(56) References Cited

U.S. PATENT DOCUMENTS

| | | | |
|---|---|---|---|
| 2003/0129978 A1 | 7/2003 | Akiyama et al. | |
| 2005/0094607 A1* | 5/2005 | Zaki et al. | 370/338 |
| 2005/0152465 A1 | 7/2005 | Maltsev et al. | |
| 2006/0056380 A1* | 3/2006 | Mitsugi et al. | 370/349 |
| 2006/0084389 A1* | 4/2006 | Beale et al. | 455/67.11 |
| 2006/0098582 A1* | 5/2006 | Varma | H04L 1/0002 370/252 |
| 2007/0002795 A1* | 1/2007 | Bi | H04W 28/22 370/329 |
| 2008/0242329 A1* | 10/2008 | Yang | H04W 72/1215 455/500 |
| 2008/0285514 A1* | 11/2008 | Uchida et al. | 370/329 |
| 2009/0052322 A1* | 2/2009 | Simonsson | H04W 28/20 370/235 |

FOREIGN PATENT DOCUMENTS

| | | |
|---|---|---|
| WO | 9803030 | 1/1998 |
| WO | 2006088401 A1 | 8/2006 |

OTHER PUBLICATIONS

Notification of the First Office Action for Chinese Patent Application No. 201080030716.6 dated Feb. 24, 2014.
Notification of the Second Office Action for Chinese Patent Application No. 201080030716.6 dated Sep. 2, 2014.
European Examination Report for Application No. 10725550.7 dated Jan. 19, 2015.

* cited by examiner

METHOD AND APPARATUS FOR OPTIMIZING TARGET ERROR RATES FOR LINK ADAPTATION IN A COMMUNICATION SYSTEM

FIELD OF THE DISCLOSURE

The present disclosure relates generally to communication systems and more particularly to a method and apparatus for optimizing target error rates for link adaptation in such communication systems.

BACKGROUND

Data communications has grown rapidly in the past decade due to the reach of internet. The number of users relying on data communications has increased significantly in the recent past. This increase in number of users and in turn the amount of data traffic per communication link poses various challenges in providing high quality of service to the users. For example, a communication system offering real time communication services such as voice and/or video is more tolerant to transmission errors than delay. On the other hand, a communication system offering communication services such as file transfer is more tolerant to delay than transmission errors, and therefore necessitates data retransmission for portions of data with errors. Communication systems offering data traffic services employ retransmission techniques for enabling a source station to retransmit data to a destination station to reduce the transmission errors. Such communication systems also employ various techniques to improve the throughput of the communication network, bandwidth efficiency, and reliability of data communication.

One such technique is link adaptation in which the attributes of each link within a communication system are updated. Communication systems may update link adaptation parameters such as modulation and coding scheme, data protection schemes, transmission power, and the like to accommodate different needs of communication. Communication systems employing existing technologies generally use fixed target error rates which are stringent, modulation and coding scheme which is conservative, and error protection which is robust in order to minimize retransmissions across all types of data. Adjustments are made to maximize both throughput and reliability and minimize retransmissions. However, there is a scope for improvement to the existing technologies in terms of optimizing the target error rates for link adaptation for certain types of applications without significant impact on overall throughput and reliability.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The present disclosure is directed towards a method of optimizing target error rates for link adaptation in a communication system. The method includes estimating a data rate associated with transmission of a data stream over a communication link. A required target error rate is then selected from a plurality of pre-defined target error rate values based on whether the estimated data rate is within a range of at least one of a plurality of pre-defined threshold values, where each of the pre-defined target error rate values maps to one of the plurality of pre-defined threshold values. A link adaptation parameter associated with the communication link is then selected or updated to maintain the required target error rate and the data stream is transmitted over the communication link using the selected/updated link adaptation parameter.

Figure 1:
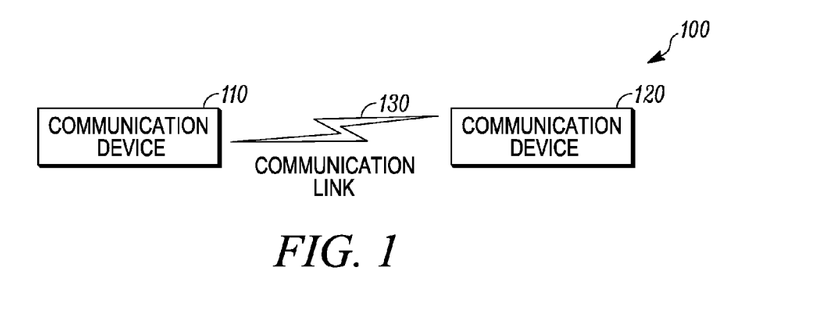
FIG. 1 is a block diagram of a communication system in accordance with some embodiments.

FIG. 1 is a block diagram illustrating an example communication system 100 employing a method for optimizing target error rates for link adaptation in accordance with some embodiments. The communication system 100 comprises a plurality of communication devices, such as communication devices 110 and 120. The communication devices 110, 120 communicate with each other via a communication link 130. In accordance with embodiments of the disclosure, the communication system 100 employs a method of optimizing target error rates for selecting link adaptation parameters for use in communication between the communication devices 110, 120 by setting target error rates based on an estimated data rate. In accordance with some embodiments, the communication link 130 employs one or more infrastructure devices (not shown) that allow the communication devices 110, 120 to wirelessly communicate with each other. For example, the infrastructure device may be any wireless communication station (referred to as a base station or a radio base station or Node B (in 3G networks), or access point base station) installed at a fixed location of the communication system 100. In some instances, the communication devices 110 can be fixed or mobile and can communicate with each other over a wireless media with or without the support of infrastructure devices or communication network. The communication link 130 may include one or more of private networks, public networks, such as the Internet, wireless networks, such as satellite and cellular networks, and local area wireless networks, such as WiFi or Bluetooth networks, local area networks (LANs), wide area networks (WANs), telephone networks, such as the Public Switched Telephone Networks (PSTN), or a combination of networks. In accordance with some embodiments, the communication system 100 employs Transport Control Protocol/Internet Protocol (TCP/IP) for providing communication between communication devices 110, 120. The embodiments of the disclosure are, however, not restricted to these networks, but one skilled in the art can also apply the instructions to other systems containing corresponding characteristics.

In accordance with some embodiments, the communication devices 110, 120 are configured to operate according to any of a number of different 2G, 3G and 4G wireless communication technologies. These include Global System for Mobile Communication (GSM), Code Division for Multiple Access (CDMA), Universal Mobile Telecommunication System (UMTS), Wideband Code Division for Multiple Access (W-CDMA), Orthogonal Frequency Division Multiplexing (OFDM), Worldwide Interoperability for Microwave Access (WiMax), Long-Term Evolution (LTE) and other communication technologies.

The communication devices 110, 120 may include devices, such as mobile phones, mainframes, minicomputers, desktop computers, laptops, notebook computers, tablet personal computers (PCs), palm PCs, personal digital assistants, smart phones, set top boxes with interactive media capability, or the like. The communication devices 110, 120 may transmit data over the communication link 130 or receive data from the communication link 130 via a wired, wireless, or optical connection.

Figure 2:
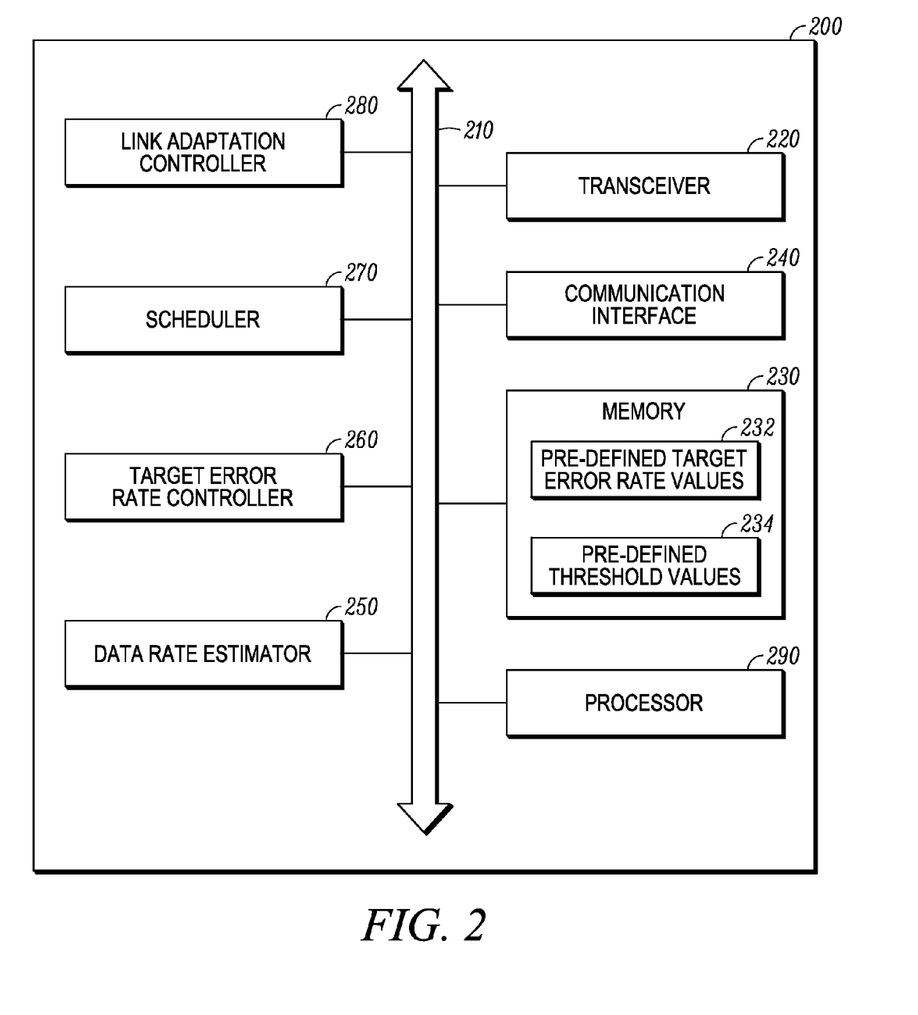
FIG. 2 is a block diagram of an apparatus employed in communication devices of FIG. 1 in accordance with some embodiments.

FIG. 2 is a block diagram of an apparatus 200 employed in the communication system 100 of FIG. 1. The apparatus 200, for example, can be implemented in communication devices 110, 120 and/or an intermediate station (not shown) that may act as a switch, or a router, or a central network authority for enabling communication between the communication devices 110, 120. The apparatus 200 includes a bus 210, one or more wired or wireless transceivers 220, a memory 230, a communication interface 240, a data rate estimator 250, a target error rate controller 260, a scheduler 270, and a link adaptation controller 280. The bus 210 may include one or more conventional buses that permit communication among the components of the apparatus 200. The apparatus 200 may also include any type of conventional processor or microprocessor 290 that interprets and executes instructions stored in the memory 230. Each transceiver 220 may be directly wired to another component or utilize wireless technology for communication, such as, but are not limited to, cellular-based communications such as analog communications (using AMPS), digital communications (using CDMA, TDMA, GSM, iDEN, GPRS, or EDGE), and next generation communications (using UMTS, WCDMA, LTE or IEEE 802.16) and their variants. Each transceiver 220 may be a receiver, a transmitter or both.

The communication interface 240 may use transceiver 220 to enable the communication device 110, 120 to communicate with other devices and/or systems. For example, the communication interface 240 may include mechanisms for communicating with another device or system via a communication link, such as communication link 130. The communication interface 240 further provides an interface to the communication link 130.

The data rate estimator 250 estimates a data rate associated with transmission of a single data stream between the communication devices 110, 120 and any other device over the communication link 130. In one embodiment, the data rate estimator 250 monitors data rate associated with transmission of a previous data stream on the communication link 130 during a pre-determined period of time. The data rate estimator 250 also estimates the data rate that is achieved during the transmission of the previous data stream over the pre-determined period of time and is based on at least one of a peak data rate, a maximum data rate, and a sustained data rate. In another embodiment, the data rate estimator 250 estimates the data rate based on whether a sustained rate is above a pre-defined data rate. In another embodiment, the data rate estimator 250 estimates the data rate based on a percentile of sustained data rate that is above a pre-defined data rate over the pre-determined period of time. In accordance with some embodiments, the data rate estimator 250 estimates the data rate based on a pre-negotiated service rate including at least one of a guaranteed bit rate, a maximum sustained data rate, and a minimum sustained data rate associated with transmission of the data stream.

The data that may be stored by the memory 230 include, but is not limited to, operating systems, applications, and databases. Each operating system includes executable code that controls basic functions of the communication, such as interaction among the components of the apparatus 200 employed in a communication device 110, 120, that may be in communication with external devices via the transceiver 220, and storage and retrieval of applications and data to and from the memory 230. In accordance with embodiments of the disclosure, the memory 230 further stores a plurality of pre-defined target error rate values 232 and a plurality of pre-defined threshold values 234, where each of the pre-defined target error rate values 232 is mapped to one of the pre-defined threshold values 234.

As used herein, the term "error rate" refers to a probability that a given data transferred between two communication devices contains an error. The term "target error rate" refers to the error rate that the communication system 100 wants to maintain at a particular level for a given communication. In other words, the target error rate refers to an acceptable level of error for a communication link, which is appropriate for a given communication. For example, the target error rate may refer to a block error rate (BLER), a frame error rate (FER) or a packet error rate (PER) depending on the implementation of the communication system. The term "BLER" refers to the probability that a block of bits transmitted from a source communication device contains an error after decoding by a destination communication device. The term "FER" refers to the probability that a frame of bits transmitted from a source communication device contains an error after decoding by a destination communication device. The term "FER" refers to the probability that a packet of bits transmitted from a source communication device contains an error after decoding by a destination communication device.

The target error rate controller 260 selects a required target error rate from the plurality of pre-defined target error rate values 232. In accordance with embodiments of the disclosure, the target error rate controller 260 selects a required target error rate based on whether the estimated data rate is within a range of at least one of the plurality of pre-defined threshold values 234. In accordance with embodiments of the disclosure, for applications with low bit rate, the target error rates can be relaxed as compared to the applications with higher bit rate without impacting the throughput and reliability of data communication.

The scheduler 270 schedules data stream for transmission over the communication link 130. The data stream is fed to the link adaptation controller 280 that selects or updates link adaptation parameters associated with the communication link 130 so as to maintain the required target error rate selected by the target error rate controller 260. The link adaptation parameters include, but not limited to, a modulation and coding scheme (MCS), a transmission power, and an error protection scheme. In one embodiment, the link adaptation controller 280 updates the link adaptation parameters associated with the communication link 130 by changing from a first link adaptation parameter to a second link adaptation parameter and enabling transmission of the data stream on the communication link 130 using the updated link adaptation parameters including the second link adaptation parameter.

In accordance with some embodiments, the link adaptation controller 280 determines that the data rate estimated by the data rate estimator 250 is above a first pre-defined threshold value of the plurality of pre-defined threshold values 234 and updates the link adaptation parameter from the first link adaptation parameter to the second link adaptation parameter. In this case, the transmission of data stream using the second link adaptation parameter has lower error tolerance than the transmission of data stream using the first link adaptation parameter. In accordance with some embodiments, the link adaptation controller 280 determines that the data rate estimated by the data rate estimator 250 is below the first pre-defined threshold value and updates the link adaptation parameter from the first link adaptation parameter to the second link adaptation parameter. In this case, the transmission of the data stream using the second link adaptation parameter has higher error tolerance than the transmission of data stream using the first link adaptation parameter. In this embodiment, the first link adaptation parameter may include a modulation and coding scheme of quadrature phase shift keying (QPSK) with a code rate of ¾, while the second link adaptation parameter may include a modulation and coding scheme of 16 quadrature amplitude modulation (16 QAM) with a code rate of ½. In other words, for communication of data stream with data rates above the first pre-defined threshold value, the target error rates can be stringent, the modulation and coding scheme can be conservative, and error protection scheme can be robust. On the other hand, for communication of data stream with data rates below the first pre-defined threshold value, the target error rates can be comparatively relaxed, modulation and coding scheme can be comparatively aggressive, and error protection scheme can be comparatively scaled back.

In one embodiment, the pre-defined target error rate values 232 stored in memory 230 can include one or more values of $10^{-4}$, $10^{-3}$, and $10^{-2}$. In accordance with embodiments of the disclosure, the pre-defined threshold values 234 refer to values of different range of data rates, where each range of data rates is mapped to one of the pre-defined target error rate values 232. The pre-defined threshold values 234 stored in memory 230 can include different range of data rates, for example data rates above 30 Mbps, data rates between 300 Kbps and 30 Mbps, data rates below 300 Kbps, where each range of data rates is mapped to one of the pre-defined target error rate values. In accordance with some embodiments, the data rates above 30 Mbps can be mapped to target error rate value of $10^{-4}$ to enable selection of $10^{-4}$ target error rate for communication when the estimated data rate for communication is above 30 Mbps. Further, the data rates between 300 Kbps and 30 Mbps can be mapped to target error rate value of $10^{-3}$ to enable selection of $10^{-3}$ target error rate for communication when the estimated data rate for communication is between 300 Kbps and 30 Mbps. Also, the data rates below 300 Kbps can be mapped to target error rate value of $10^{-2}$ to enable selection of $10^{-2}$ target error rate for communication when the estimated data rate for communication is below 300 Kbps. In accordance with embodiments of the present disclosure, the target error rates are optimized for link adaptation by selecting a relaxed target error rate of $10^{-2}$ for applications with data rate below 300 Kbps when compared to applications with data rate above 300 Kbps, where the target error rate is selected to be comparatively stringent. The above pre-defined threshold values and the pre-defined target error rate values, and their mapping are for illustrative purposes only, and that these values can alternatively include any other values in accordance with the scope of the disclosure.

In accordance with the embodiments of the disclosure, the target error rate controller 260 determines whether the data rate (estimated by the data rate estimator 250) is within a range of one of the pre-defined threshold values 234. Assume that the data rate estimator 250 has estimated data rate of a data stream to be 200 Kbps. In this case, the target error rate controller 260 selects $10^{-2}$ as the required target error rate because that is the estimated data rate when the range of data rates below 300 Kbps as described above. In the case that the data rate estimator 250 has estimated data rate of a data stream to be 10 Mbps. In this case, the target error rate controller 260 selects $10^{-3}$ as the required target error rate because that is the estimated data rate when the data rates range between 300 Kbps and 30 Mbps. In the case that the data rate estimator 250 has estimated data rate of a data stream to be 100 Mbps. The target error rate controller 260 selects $10^{-4}$ as the required target error rate because that is what is mapped to target error rate value of $10^{-4}$ as described above.

The link adaptation controller 280 updates or selects the link adaptation parameters depending on which of the target error rate values (e.g., $10^{-4}$, $10^{-3}$, and $10^{-2}$) is selected as the required target error rate. In such cases, the transmission of data stream with link adaptation parameters updated/selected to maintain the target error rate of $10^{-4}$ has lower error tolerance than the transmission of data stream with link adaptation parameters updated to maintain the target error rate of $10^{-3}$ or $10^{-2}$. Similarly, the transmission of data stream with link adaptation parameters updated/selected to maintain the target error rate of $10^{-3}$ has lower error tolerance than the transmission of data stream with link adaptation parameters updated to maintain the target error rate of $10^{-2}$.

Figure 3:
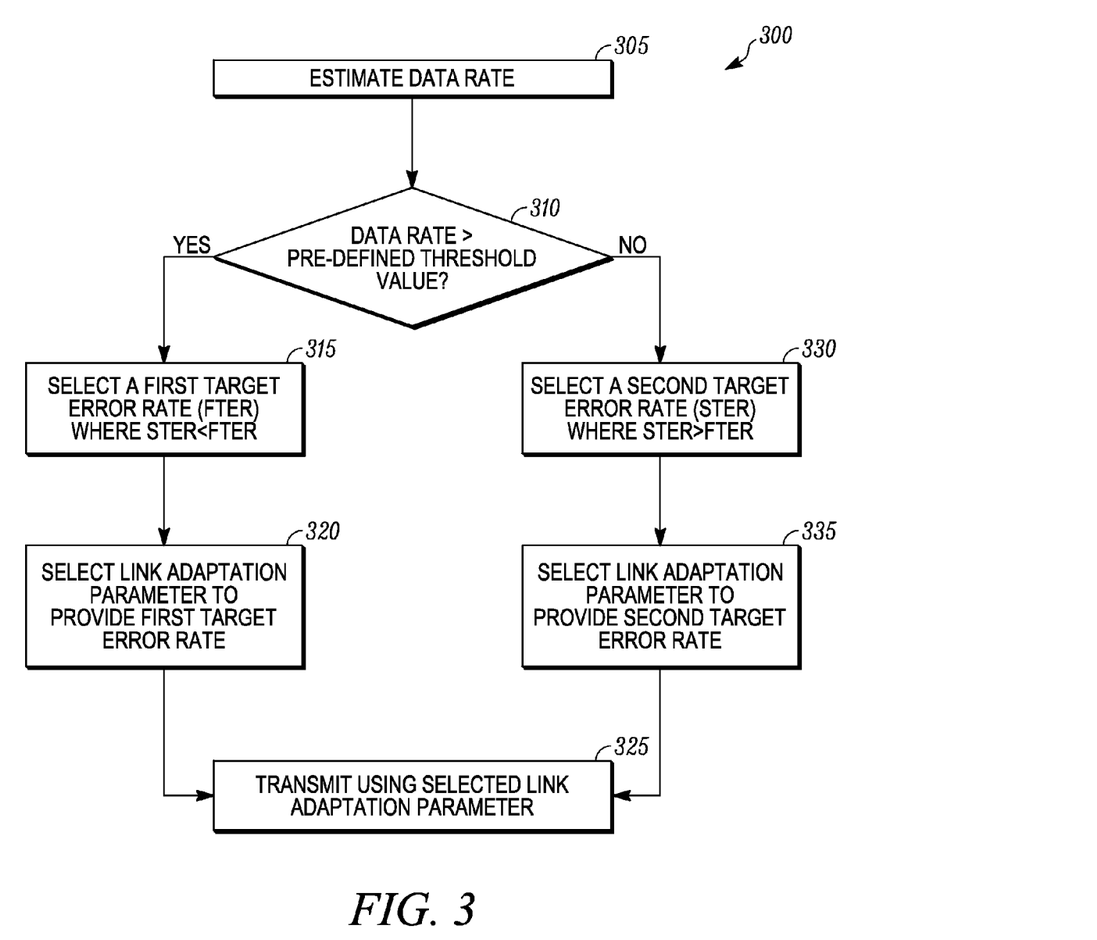
FIG. 3 is flowchart of a method of optimizing target error rates for link adaptation in a communication system in accordance with some embodiments.

FIG. 3 is a flowchart of a method 300 for optimizing target error rates for link adaptation associated with a communication link 130 in a communication system 100 in accordance with some embodiments. The method 300 is initiated when a data stream is scheduled for transmission from a communication device 110, 120 to any other device. At block 305, the data rate estimator 250 determines the data rate associated with the data stream to be transmitted. In accordance with embodiments of the present disclosure, the data rate can be estimated using methods as previously described with reference to FIG. 2. Next, at block 310, the target error rate controller 260 determines whether the estimated data rate is above a pre-defined threshold value of the plurality of pre-defined threshold values 234.

Next, at block 315, when the estimated data rate is determined to be above the pre-defined threshold (e.g., 30 Mbps), the target error rate controller selects a first target error rate (e.g., $10^{-2}$) from the plurality of pre-defined target error values 232 (e.g., $10^{-4}$, $10^{-3}$, and $10^{-2}$), where the first target error rate (FTER) ($10^{-4}$) is less than a second target error rate (STER) (e.g., either $10^{-3}$ or $10^{-2}$). After selecting the first target error rate as the required target error rate, the link adaptation controller 280 selects a link adaptation parameter to provide the first target error rate. In other words, the selected link adaptation parameter maintains the target error rate value equal to the first target error rate for the data stream transmitted on the communication link 130. For example, the link adaptation parameter selects at least one of a first modulation and coding scheme, a first transmission power, and a first error protection scheme. Next, at block 325, the transceiver 220 transmits the data stream on the communication link 130 using the selected link adaptation parameter.

Returning to block 310, when the estimated data rate is determined to be below the pre-defined threshold value (e.g., 30 Mbps), at block 330, the target error rate controller selects a second target error rate (e.g., either $10^{-3}$ or $10^{-2}$) from the plurality of pre-defined target error values 232, where the second target error rate (e.g., either $10^{-3}$ or $10^{-2}$) is greater than the first target error rate (e.g., $10^{-4}$). After selecting the second target error rate as the required target error rate, at block 335, the link adaptation controller 280 selects a link adaptation parameter to provide the second target error rate. In other words, the selected link adaptation parameter maintains the target error rate value equal to the second target error rate for the data stream transmitted on the communication link 130. For example, the link adaptation parameter selects at least one of a second modulation and coding scheme, a second transmission power, and a second error protection scheme.

In accordance with embodiments of the disclosure, the first modulation and coding scheme is at a lower level than the second modulation and coding scheme, the first transmission power is higher than the second transmission power, and the first error protection scheme is less error tolerant than the second protection scheme. For example, the first modulation and coding scheme can be QPSK with a code rate of ¾, while the second modulation and coding scheme can be 16 QAM with a code rate of ½. In one embodiment, the selection of modulation schemes can be considered together with the existing retransmission schemes, such as repetition, hybrid automatic repeat request (HARQ) (with chase combining or incremental redundancy) and automatic repeat request (ARQ). The number of retransmissions and the coding blocks that are retransmitted can be determined accordingly to achieve the target FER. For instance, lower maximum allowed number of retransmissions can be used when a conservative MCS is chosen and low target error rate is required. Higher maximum allowed number of retransmissions can be used for when aggressive MCS is chosen and high target error rate can be tolerated. Next, at block 325, the transceiver 220 transmits the data stream on the communication link 130 using the selected link adaptation parameter, for example, using at least one of the second modulation and coding scheme, the second transmission power, and the second error protection scheme.

Figure 4:
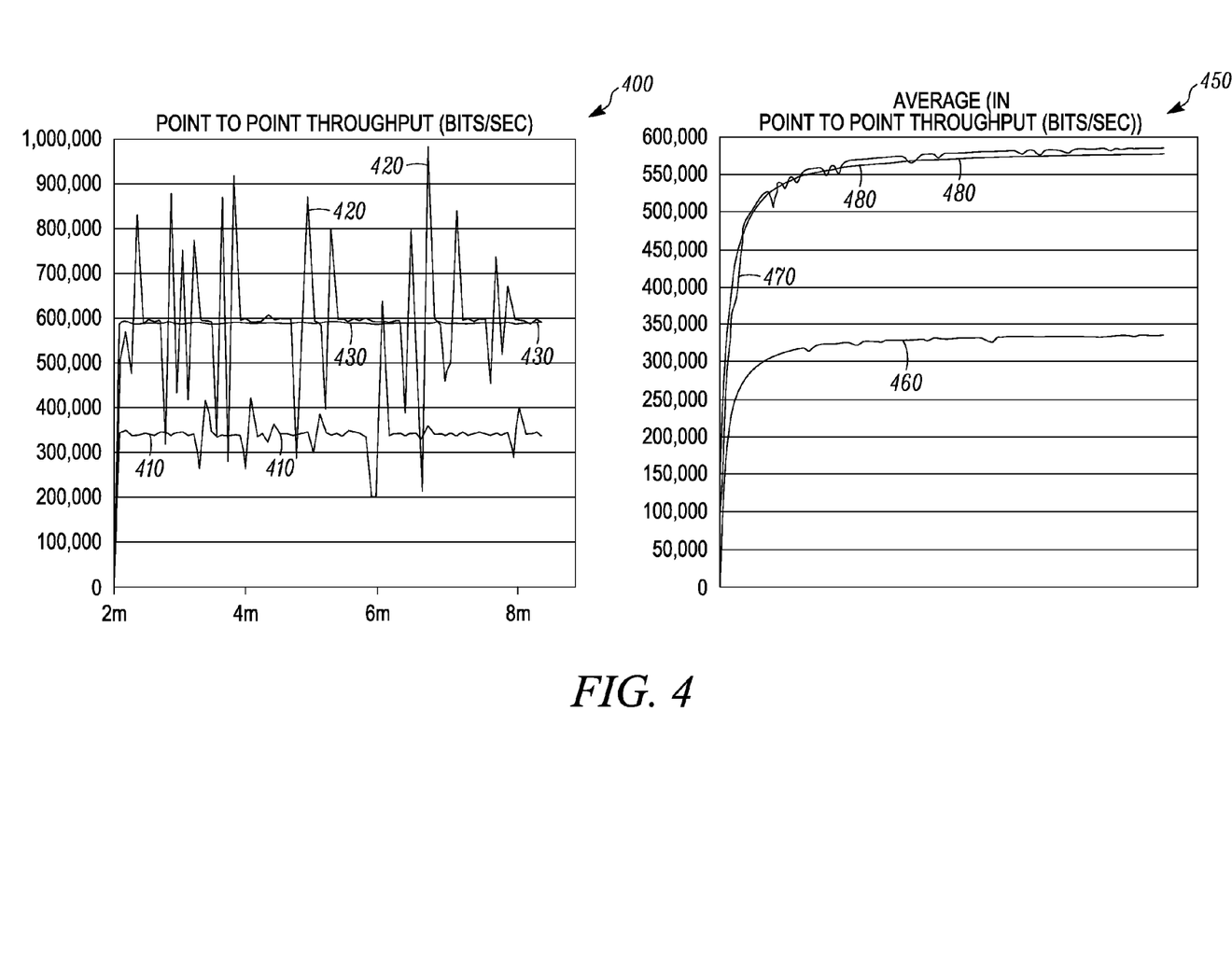
FIG. 4 represents graphs illustrating simulation results of TCP communication behavior for traffic of 300 Kbps and 500 Kbps with $10^{-2}$ packet error rate.

FIG. 4 represents graphs 400 and 450 illustrating simulation results of TCP communication behavior for traffic of 300 Kbps and 500 Kbps with $10^{-2}$ IP packet error rate. Graph 400 shows a line 410 that depicts the TCP behavior (throughput) changes along with time for offered traffic of 300 Kbps with $10^{-2}$ IP packet error rate. Graph 400 further shows a line 420 that depicts the TCP behavior (throughput) changes along with time for offered traffic of 500 Kbps with target IP packet error rate of $10^{-2}$. Also, shown is line 430 that depicts the TCP behavior for offered traffic of 500 Kbps with target IP packet error rate of $10^{-3}$. Similarly, graph 450 shows a line 460 that depicts the moving average of the TCP throughput for offered traffic of 300 Kbps with $10^{-2}$ target IP packet error rate, a line 470 that depicts the moving average of the TCP throughput for offered traffic of 500 Kbps with $10^{-2}$ target IP packet error rate, and a line 480 that depicts the moving average of the TCP throughput for offered traffic of 500 Kbps with $10^{-3}$ target packet error rate. Graphs 400 and 450 show that for traffic of 300 Kbps, the $10^{-2}$ IP packet error rate is tolerable, but for 500 Kbps, the $10^{-3}$ IP packet error rate is preferred.

Figure 5:
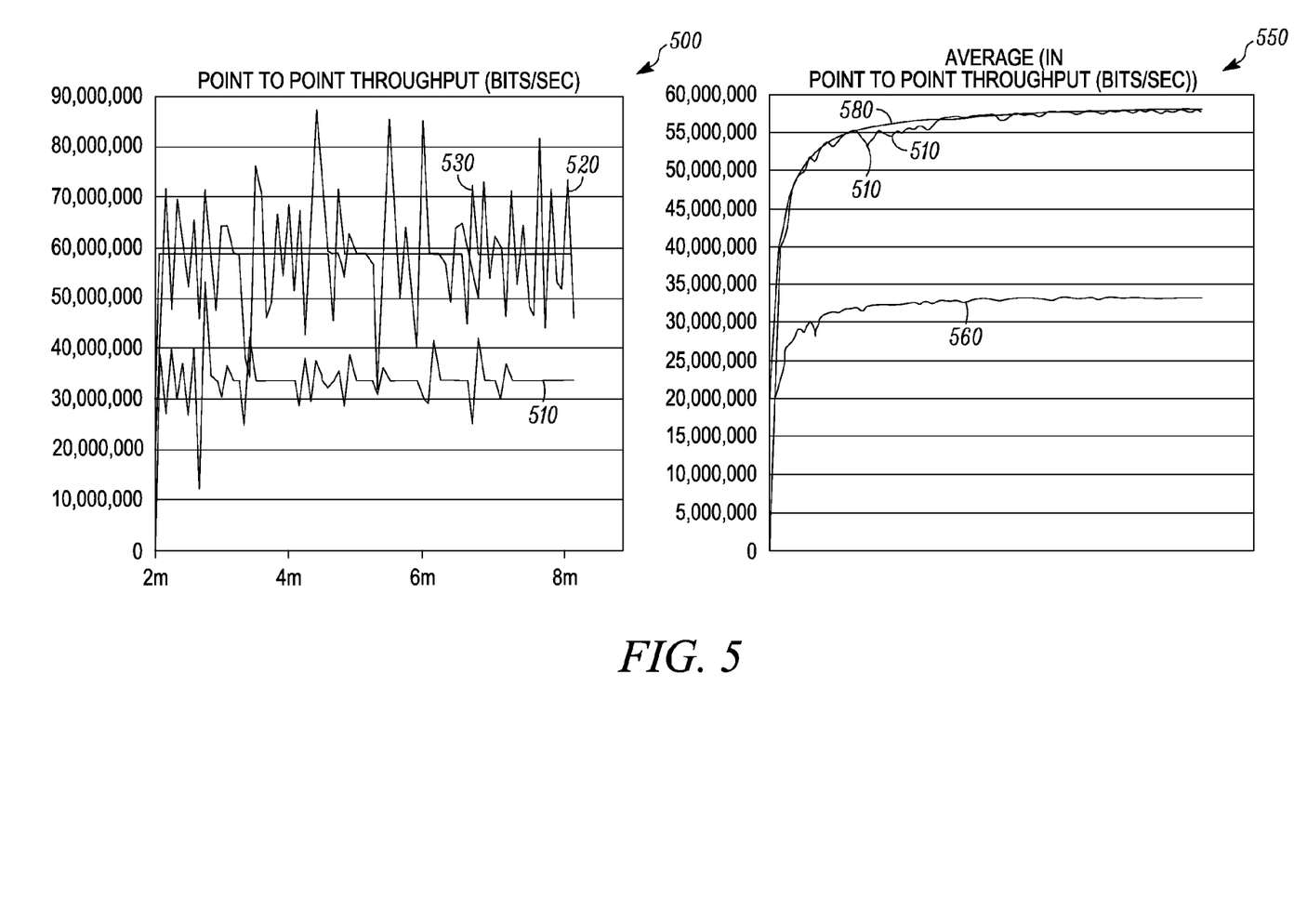
FIG. 5 represents graphs illustrating simulation results of TCP communication behavior for traffic of 30 Mbps and 50 Mbps with $10^{-3}$ packet error rate.

FIG. 5 represents graphs 500 and 550 illustrating simulation results of TCP communication behavior for traffic of 30 Mbps and 50 Mbps with $10^{-3}$ IP packet error rate. Graph 500 shows a line 510 that depicts the TCP behavior (throughput) changes along with time for offered traffic of 30 Mbps with $10^{-3}$ IP packet error rate. Graph 500 further shows a line 520 that depicts the TCP behavior (throughput) changes along with time for offered traffic of 50 Mbps with target IP packet error rate of $10^{-3}$. Also, shown is line 530 that depicts the TCP behavior for offered traffic of 50 Mbps with target IP packet error rate of $10^{-4}$. Similarly, graph 550 shows a line 560 that depicts the moving average of the TCP throughput for offered traffic of 30 Mbps with $10^{-3}$ target IP packet error rate, a line 570 that depicts the moving average of the TCP throughput for offered traffic of 50 Mbps with $10^{-3}$ target IP packet error rate, and a line 580 that depicts the moving average of the TCP throughput for offered traffic of 50 Mbps with $10^{-4}$ target IP packet error rate. Graphs 500 and 550 shows that for traffic of 30 Mbps, the $10^{-3}$ IP packet error rate is tolerable, but for 50 Mbps, the $10^{-4}$ IP packet error rate is preferred.

From the simulation results illustrated in graphs 400 and 500, it can be established that for certain types of applications (TCP applications with low offered guaranteed bit rates of 30 Mbps when compared to guaranteed bit rates of 50 Mbps), per packet reliability can be reduced by relaxing the target error rates without having significant impact on overall throughput and reliability of TCP connection. Using relaxed target error rates for low bit-rate applications also results in reduced uplink/downlink power, reduced uplink/downlink interference, use of less redundant/protected modulation and coding scheme, and eliminates the need for automatic repeat request (ARQ) mechanism on top of hybrid automatic repeat request (ARQ) mechanism used for error control in data communication. Relaxed target error rates for low bit rate applications also allows more time for a mobile communication device to exit radio frequency (RF) deep fade before TCP retransmissions. Adjusting target error rates (PER or FER or BLER) based on the data rate of a data stream to be transmitted also minimizes the occurrence of the TCP's congestion avoidance logic.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
    estimating a data rate associated with transmission of a data stream over a communication link according to a pre-defined communication protocol;
    selecting a required target error rate from a plurality of pre-defined target error rate values based on whether the estimated data rate is within a range of at least one of a plurality of pre-defined data rate threshold values, wherein each of the pre-defined target error rate values is mapped to one of the plurality of pre-defined data rate threshold values, and wherein the pre-defined data rate threshold values are selected, and the plurality of pre-defined target error rate values are mapped to the pre-defined data rate threshold values, such that the selected target error rate is higher than a target error rate which the communication protocol specifies for the estimated data rate;
    updating a link adaptation parameter associated with the communication link to maintain the required target error rate; and
    transmitting the data stream over the communication link using the updated link adaptation parameter.

2. The method as claimed in claim 1, wherein updating a link adaptation parameter comprises
    changing from a first link adaptation parameter to a second link adaptation parameter, and
    transmitting the data stream on the communication link using the second link adaptation parameter.

3. The method as claimed in claim 2, wherein
    when the estimated data rate is above a first pre-defined data rate threshold value of the plurality of pre-defined data rate threshold values, the transmission of data stream using the second link adaptation parameter has lower error tolerance than the transmission of data stream using the first link adaptation parameter, and
    when the estimated data rate is below the first pre-defined data rate threshold value of the plurality of pre-defined data rate threshold values, the transmission of data stream using the second link adaptation parameter has higher error tolerance than the transmission of data stream using the first link adaptation parameter.

4. The method as claimed in claim 1, wherein estimating data rate further comprises
    monitoring data rate associated with transmission of a previous data stream on the communication link during a pre-determined period of time, and
    estimating the data rate based on at least one of a peak data rate, a maximum data rate, and a sustained data rate achieved during the transmission of the previous data stream over the pre-determined period of time.

5. The method as claimed in claim 1, wherein estimating data rate further comprises monitoring data rate associated with transmission of a previous data stream on the communication link over a pre-determined period of time, and estimating the data rate based on whether a sustained data rate is above a pre-defined data rate.

6. The method as claimed in claim 1, wherein estimating data rate further comprises monitoring data rate associated with transmission of a previous data stream on the communication link over a pre-determined period of time, and estimating the data rate based on a percentile of sustained data rate that is above a pre-defined data rate over the pre-determined period of time.

7. The method as claimed in claim 1, wherein estimating the data rate is based on a pre-negotiated service rate including at least one of a guaranteed bit rate, a maximum sustained data rate, and a minimum sustained data rate associated with transmission of the data stream.

8. The method as claimed in claim 1, wherein updating a link adaptation parameter comprises updating at least one of a modulation and coding scheme, a transmission power, and an error protection scheme.

9. The method as claimed in claim 2, wherein the first link adaptation parameter includes a modulation and coding scheme of quadrature phase shift keying with a code rate of ¾, while the second link adaptation parameter includes a 16 quadrature amplitude modulation with a code rate of ½.

10. The method as claimed in claim 1, wherein the target error rate is at least one of a packet error rate, a frame error rate, and a block error rate.

11. A method, comprising estimating a data rate associated with transmission of a data stream on a communication link according to a pre-defined communication protocol;

comparing the estimated data rate with a pre-defined data rate threshold value;

when the estimated data rate is above the pre-defined data rate threshold value,
  selecting a first target error rate based on the estimated data rate, and
  selecting a link adaptation parameter for transmitting the data stream on the communication link, such that, the selected link adaptation parameter provides the selected first target error rate; and when the estimated data rate is below the pre-defined data rate threshold value,
  selecting a second target error rate based on the estimated data rate, and
  selecting a link adaptation parameter for transmitting the data stream on the communication link, such that, the selected link adaptation parameter provides the selected second target error rate, wherein the transmission of the data stream using the link adaptation parameter providing the selected first target error rate has lower error tolerance than the transmission of the data stream using the link adaptation parameter providing the second target error rate, and wherein the pre-defined data rate threshold value is selected, and the first target error rate and the second target error rate are mapped to the pre-defined data rate threshold value, such that the second target error rate is higher than a target error rate which the communication protocol specifies for the estimated data rate.

12. The method as claimed in claim 11, further comprising selecting the first target error rate of $10^{-4}$, when the estimated data rate is above the pre-defined data rate threshold value of 30 megabits per second (Mbps), and selecting the link adaptation parameter for transmitting the data stream on the communication link to select at least one of a first modulation and coding scheme, a first transmission power, and a first error protection scheme.

13. The method as claimed in claim 12, further comprising selecting the second target error rate of at least one of $10^{-3}$ and $10^{-2}$, when the estimated data rate is below the pre-defined data rate threshold value of 30 Mbps, and selecting the link adaptation parameter for transmitting the data stream on the communication link to select at least one of a second modulation and coding scheme, a second transmission power, and a second error protection scheme, wherein the first modulation and coding scheme is at a lower level than the second modulation and coding scheme, the first transmission power is higher than the second transmission power, and the first error protection scheme is less tolerant to error than the second error protection scheme.

14. The method as claimed in claim 11, further comprising monitoring data rate associated with transmission of a previous data stream on the communication link over a pre-determined period of time, and estimating the data rate based on at least one of a peak data rate, or a maximum data rate, or a sustained data rate achieved during the transmission of the previous data stream over the pre-determined period of time.

15. The method as claimed in claim 11, wherein estimating the data rate is based at least one of a guaranteed bit rate, or a maximum sustained data rate, or a minimum sustained data rate associated with transmission of the data stream.

16. An apparatus comprising, a communication interface for providing an interface to a communication link;

a memory for storing a plurality of pre-defined target error rate values and a plurality of pre-defined data rate threshold values, wherein each of the pre-defined target error rate values is mapped to one of the pre-defined data rate threshold values;

a data rate estimator for estimating a data rate associated with transmission of a data stream on a communication link according to a pre-defined communication protocol;

a target error rate controller for selecting a required target error rate from the plurality of pre-defined target error rate values based on whether the estimated data rate is within a range of at least one of the plurality of pre-defined data rate threshold values, and wherein the pre-defined data rate threshold values are selected, and the plurality of pre-defined target error rate values are mapped to the pre-defined data rate threshold values, such that the selected target error rate is higher than a target error rate which the communication protocol specifies for the estimated data rate;

a link adaptation controller for selecting at least one link adaptation parameter associated with the communication link to maintain the required target error rate; and a transmitter for transmitting the data stream on the communication link using the selected link adaptation parameter.

17. The apparatus as claimed in claim 16, wherein the data rate estimator monitors data rate associated with transmission of a previous data stream on the communication link over a pre-determined period of time, and estimates the data rate based on at least one of a peak data rate, or a maximum data rate, or a sustained data rate achieved during the transmission of the previous data stream over the pre-determined period of time.

18. The apparatus as claimed in claim 16, wherein the data rate estimator estimates the data rate based on at least one of a guaranteed bit rate, or a maximum sustained data rate, or a minimum sustained data rate associated with transmission of the data stream.

19. The apparatus as claimed in claim 16, wherein the at least one link adaptation parameter is at least one of a modulation and coding scheme, a transmission power, and an error protection scheme.

20. The apparatus as claimed in claim 16, wherein the target error rate is at least one of a packet error rate, a frame error rate, and a block error rate.

* * * * *